United States Patent [19]

Pfeifer

[11] 4,202,961
[45] May 13, 1980

[54] TRANSPARENT POLYAMIDE FROM AROMATIC DICARBOXYLIC ACID AND DISUBSTITUTED DECANE DIAMINE

[75] Inventor: Josef Pfeifer, Therwil, Switzerland

[73] Assignee: Ciba-Geigy Corporation, Ardsley, N.Y.

[21] Appl. No.: 954,808

[22] Filed: Oct. 26, 1978

[30] Foreign Application Priority Data

Oct. 28, 1977 [CH] Switzerland ............... 13148/77

[51] Int. Cl.² ............................................. C08G 69/26
[52] U.S. Cl. ................................. 528/324; 260/33.4 R; 528/310; 528/330; 528/331; 528/338; 528/346; 528/347; 528/349
[58] Field of Search ............. 528/349, 324, 330, 331

[56] References Cited

U.S. PATENT DOCUMENTS

| 3,150,117 | 9/1964 | Gabler | 528/349 |
|---|---|---|---|
| 3,563,959 | 2/1971 | Schade et al. | 528/349 |
| 3,939,147 | 2/1976 | Hugelin | 260/239 BC |

FOREIGN PATENT DOCUMENTS

1251520 10/1971 United Kingdom .

OTHER PUBLICATIONS

Chemical Abstracts, vol. 36 (1942), 4720⁴.

*Primary Examiner*—Harold D. Anderson
*Attorney, Agent, or Firm*—Luther A. R. Hall

[57] ABSTRACT

The transparent polyamides according to the invention are obtained by polycondensation of mixtures of terephthalic acid, or of an amide-forming derivative thereof, and a diamine of the formula I

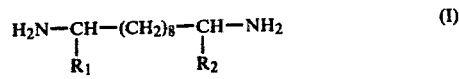

in which $R_1$ and $R_2$ are each cycloalkyl which has 4–12 C atoms and which can be substituted by alkyl, (a) with for example 10 to 20% by weight of ε-aminocaproic acid or caprolactam, or
(b) with for example 10 to 20% by weight of an essentially stoichiometric mixture of adipic acid and hexamethylenediamine or of the AH salt.

The polycondensation reaction is performed by known methods, preferably by melt condensation. The resulting polyamides are transparent and are resistant to boiling. They show only a slight absorption of water and are stable to hydrolysis. They can be processed for example by the injection-moulding process and by extrusion into the form of moulded articles.

11 Claims, No Drawings

TRANSPARENT POLYAMIDE FROM AROMATIC DICARBOXYLIC ACID AND DISUBSTITUTED DECANE DIAMINE

The present invention relates to novel transparent polyamides, to processes for producing them, and to their use for producing transparent moulded articles.

In the German Offenlegungsschrift No. 1,720,534 are described generically transparent copolyamides resistant to boiling and formed from aromatic dicarboxylic acids, caprolactam and unsubstituted or alkyl-substituted alkylenediamines which have 1-10 C atoms in the chain and which are substituted on at least one of the two terminal C atoms by an alkyl group having 1-4 C atoms. The proportion of caprolactam used is 1-25, preferably 5-15, percent by weight, relative to the amount of dicarboxylic acid and alkylenediamine. The actual disclosure in this Offenlegungsschrift is restricted however to copolyamides formed from aromatic dicarboxylic acids, caprolactam and alkylenediamines of the aforementioned type having a maximum of 7 C atoms in the chain. In the British Patent Specifications Nos. 905,475 and 919,096 are described further transparent polyamides from terephthalic acid or isophthalic acid, or mixtures thereof, and hexamethylenediamines having at least three C atoms, introduced by alkyl-substitution, in one or more side chains, such as 2,2,4- and 2,4,4-trimethylhexamethylenediamine, 2-methyl-4-ethylhexamethylenediamine and 2-ethyl-4-methylhexamethylenediamine, or isomeric mixtures of hexamethylenediamines of this kind. These prior known transparent polyamides however leave much to be desired with regard to water absorption, stability to hydrolysis and/or dimensional stability under the action of moisture, in consequence of which also the mechanical and electrical properties of these polyamides are impaired.

The object of the invention was therefore to provide novel transparent polyamides which are resistant to boiling and which have less absorption of water, increased stability to hydrolysis, good dimensional stability under the action of moisture, and correspondingly improved mechanical and electrical properties.

The subject matter of the present invention are novel transparent polyamides which are obtained by polycondensing a mixture of essentially stoichiometric amounts of terephthalic acid, or of an amide-forming derivative thereof, and a diamine of the formula I

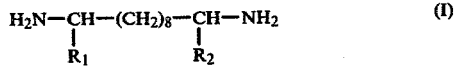
(I)

(a) with 10 to $(n \times 2.5) + 7.5$ percent by weight of an ω-aminocarboxylic acid of the formula II

(II)

or of the corresponding lactam, or (b) with 10 to $(m + p/2 \times 2.5) + 7.5$ percent by weight of a mixture of essentially stoichiometric amounts of a dicarboxylic acid of the formula III

(III)

and a diamine of the formula IV

(IV), or of the equivalent amount of a mixture of essentially stoichiometric amounts of an amide-forming derivative of a dicarboxylic acid of the formula III and a diamine of the formula IV, wherein the given weight percentages relate to the sum of all the reaction components, and $R_1$ and $R_2$ independently of one another are cycloalkyl which has 4–12 C atoms and which can be substituted by alkyl, $R_3$ is alkylene having 5–11 C atoms, $R_4$ is alkylene having 4–10 C atoms, and $R_5$ is alkylene having 6–12 C atoms, and wherein n is equal to the number of C atoms in the radical $R_3$, m is equal to the number of C atoms in the radical $R_4$, and p is equal to the number of C atoms in the radical $R_5$.

If cycloalkyl groups $R_1$ or $R_2$ are substituted by alkyl groups, these are in particular alkyl groups having 1–4 C atoms, and especially 1 or 2 C atoms. Cycloalkyl groups $R_1$ and $R_2$ preferably have only one alkyl substituent of that kind. Particularly preferred are however unsubstituted cycloalkyl groups $R_1$ and $R_2$, especially those having 4–8 C atoms, and more especially the cyclopentyl, cyclohexyl and cyclooctyl groups.

Alkylene groups $R_3$, $R_4$ and $R_5$ can be straight-chain or branched-chain, but are preferably straight-chain. Examples of such alkylene groups are the tetramethylene, pentamethylene, hexamethylene, heptamethylene, octamethylene, decamethylene and dodecamethylene groups.

As amide-forming derivatives of terephthalic acid or of the dicarboxylic acids of the formula III, it is possible to use for example the corresponding dihalides, especially the dichlorides, also dinitriles or activated diesters, particularly the diphenyl esters.

Preferred polyamides are those which are obtained by polycondensation of a mixture of essentially stoichiometric amounts of terephthalic acid, or of an amide-forming derivative thereof, and a diamine of the formula I with 13 to $(n \times 1.3) + 11$ percent by weight of an ω-aminocarboxylic acid of the formula II, or of the corresponding lactam, or with 13 to $(m + p/2 \times 1.3) + 11$ percent by weight of a mixture of essentially stoichiometric amounts of a dicarboxylic acid of the formula III and a diamine of the formula IV, or of the equivalent amount of a mixture of essentially stoichiometric amounts of an amide-forming derivative of a dicarboxylic acid of the formula III and a diamine of the formula IV, wherein $R_1$ and $R_2$ are each cyclopentyl, cyclohexyl or cyclooctyl, and $R_3$, $R_4$ and $R_5$ are straight-chain alkylene having the C number as defined.

Further preferred polyamides according to the invention are the following three types:

(1) Polyamides which are obtained by polycondensation in each case of mixtures of essentially stoichiometric amounts of terehthalic acid, or of an amide-forming derivative thereof, and 1,10-diamino-1,10-dicyclohexyldecane with 10 to 20% by weight, preferably about 15% by weight, of ε-amino-n-caproic acid or caprolactam.

(2) Polyamides which are obtained by polycondensation in each case of mixtures of essentially stoichiometric amounts of terephthalic acid, or of an amide-forming derivative thereof, and 1,10-diamino-1,10-dicyclohexyldecane with 10 to 32.5% by weight, preferably about 15% by weight, of 11-aminoundecanoic acid or of the corresponding lactam.

(3) Polyamides which are obtained by polycondensation in each case of mixtures of essentially stoichiometric amounts of terephthalic acid, or of an amide-forming derivative thereof, and 1,10-diamino-1,10-dicyclohexyldecane with 10 to 20% by weight, preferably about 15% by weight, of 6—6 salt, or of a mixture of essentially stoichiometric amounts of adipic acid, or of an amide-forming derivative thereof, and hexamethylenediamine.

The reaction of the reaction components as defined can be performed by methods known per se. The preferred production process is the melt polycondensation process in several stages. In this case, the reaction components as defined, for example aminocarboxylic acids of the formula II or corresponding lactams, mixtures of terephthalic acid and diamine of the formula I, and optionally mixtures of dicarboxylic acids of the formula III and diamines of the formula IV, particularly salts from terephthalic acid and diamines of the formula I, and optionally salts from dicarboxylic acids of the formula III and diamines of the formula IV, are pre-condensed under pressure at temperatures between about 220° and 300° C. in the melt, advantageously under inert gas, such as nitrogen. The salts to be used for the pre-condensation reaction are advantageously produced separately from essentially stoichiometric amounts of terephthalic acid and diamine of the formula I, and optionally dicarboxylic acids of the formula III and diamines of the formula IV, in suitable inert organic solvents. Suitable inert organic solvents are, for example, cycloaliphatic alcohols such as cyclopentanol and cyclohexanol, and especially aliphatic alcohols having up to 6 C atoms, such as methanol, ethanol, n-propanol, butanols, pentanols and hexanols, and also mixtures of solvents of this kind with water. The precondensate can subsequently be further condensed at temperatures between about 220° and 300° C. under normal pressure, and advantageously likewise in an inert-gas atmosphere, until the polyamides according to the invention are formed, and at the end of the polycondensation reaction there is optionally applied a vacuum for degassing the polyamide.

Polyamides according to the invention can also be optionally produced by melt polycondensation of diamine of the formula I and essentially stoichiometric amounts of an activated ester of terephthalic acid with an aminocarboxylic acid of the formula II or a corresponding lactam, or with diamine of the formula IV and essentially stoichiometric amounts of an activated ester of a dicarboxylic acid of the formula III. Suitable activated esters are in particular the corresponding diphenyl esters. Finally, polyamides of the invention according to process variant (b) can also be optionally produced, in a manner known per se, by condensation in solution or by interfacial surface polycondensation.

The starting products of the formulae I, II, III and IV to be used according to the invention are known and can be produced in a manner known per se. Diamines of the formula I can be obtained in a particularly advantageous manner by catalytically hydrogenating in the 3,12-position correspondingly substituted 1,2-diaza-1,5,9-cyclododecatriens or 1,2-diazacyclododecanes in the presence of an inert organic solvent.

The polyamides according to the invention have a transparent appearance, are resistant to boiling water, and are distinguished in particular by a low water absorption, high stability to hydrolysis and/or good dimensional stability. Furthermore, the properties of the polyamides according to the invention, such as the mechanical and electrical properties, are only slightly affected by the action of moisture.

The polyamides according to the invention can be processed, by methods known per se, into transparent moulded articles of the most varied types which are stable to hydrolysis and resistant to boiling, for example by the injection-moulding process or extrusion process. They are particularly suitable for producing transparent appliances or parts of appliances from the melt.

EXAMPLE 1

In a reaction vessel, which is provided with stirrer, reflux condenser and dropping funnel, 116.0g of terephthalic acid in a mixture of 2500 ml of ethanol and 900ml of water is heated to reflux temperature, whereupon 235.0 g of 1,10-diamino-1,10-dicyclohexyldecane is added dropwise from the dropping funnel in the course of 10 minutes. The mixture is refluxed for 48 hours and then cooled to room temperature (20°-25° C.), and the salt which has formed is filtered off. The yield after drying in vacuo is 344 g of salt (98% of theory). 8.5 g of this salt is subsequently mixed with 1.5 g of caprolactam, and the mixture is sealed under nitrogen into a bomb tube. The bomb tube is then immersed for 3 hours in a salt bath heated to 280° C. After cooling to room temperature, the reaction product is removed from the tube and is transferred to a condensing tube. As nitrogen is introduced, the reaction mixture is melted at 280° C. and held for 8 hours at this temperature. The melt on cooling solidifies to form a transparent substance. The measurement of the reduced solution viscosity, measured on a 0.5% solution in m-cresol at 25° C., gives a value of 0.80 dl/g. The glass transition temperature of the polyamide obtained, determined in a closed vessel by means of differential thermoanalysis, is 149° C.

The polyamide is moulded by means of a hydraulic press at 270° C. into the form of a sheet. Water absorption of the sheet after 1 week's storage at room temperature with 65% relative humidity is 1.3% by weight. The sheet exhibited no change in transparency after being treated for 6 hours in boiling water.

EXAMPLES 2–10

In the Table which follows there listed further polyamides which were obtained by the process described in Example 1 from differing amounts of salt from terephthalic acid and 1,10-diamino-1,10-dicyclohexyldecane and varying proportions of caprolactam, 11-aminoundecanoic acid or laurolactam. The properties of the resulting polyamides are likewise given in the Table.

EXAMPLES 11–13

Further copolyamides are obtained by polycondensation of the salt described in Example 1 with different proportions of the commercially obtainable salt from adipic acid and hexamethylenediamine (6,6 salt) using the process described in Example 1. The properties of the polyamides thus obtained are shown in the Table.

EXAMPLE 14

In a round-bottomed flask, which is fitted with stirrer, reflux condenser and dropping funnel, 20.22 g of sebacic acid is dissolved in 500 ml of ethanol at 60° C. with stirring; and there is then rapidly added, through the dropping funnel, 20.04 g of 1,12-diaminododecane. The reaction mixture heats up during this time to boiling temperature, while the salt which is forming immediately commences to precipitate. After being stirred for 15 minutes under reflux, the white suspension which has formed is cooled to 5° C., and filtered after a further 30 minutes. The salt obtained is dried at 80° C. in vacuo to give a yield of 39.7 g (98.6% of theory). 2.0 g of this salt is then mixed with 8.0 g of salt obtained according to Example 1 from terephthalic acid and 1,10-diamino-1,10-dicyclohexyldecane, and the mixture is sealed under nitrogen in a bomb tube. The bomb tube is then immersed for 3 hours in a salt bath at 280° C., and after cooling to room temperature the contents are taken from the tube and transferred to a condensing tube. While nitrogen is being introduced, the contents of the tube are melted at 280° C. and are held at this temperature for 8 hours. The properties of the polyamide obtained are given in the Table.

EXAMPLE 15

Example 14 is repeated with however the difference that 30% by weight of the salt produced according to Example 14 is used as co-condensation component. The properties of the polyamide obtained are given in the Table.

EXAMPLE 16

7.5 g of the salt (described in Example 1) from terephthalic acid and 1,10-diamino-1,10-dicyclohexyldecane is mixed with 2.5 g of a salt, produced analogously to that in Example 14, from 1,8-diaminooctane and dodecandioic acid (1,12), and the mixture is polycondensed under the conditions described in Example 1. The properties of the polyamide obtained are given in the Table.

EXAMPLES 17 AND 18

By polycondensation of the salt described in Example 1, formed from terephthalic acid and 1,10-diamino-1,10-dicyclohexyldecane with caprylic lactam (8-aminooctanoic acid lactam) in the quantity ratios given in the Table, there are produced further copolyamides of which the properties are summarised in the Table.

EXAMPLE 19

A mixture of 11.92 g of 1,10-diamino-1,10-dicyclooctyldecane, 9.61 g of diphenyl terephthalate and 3.45 g of 6-aminocaproic acid is polycondensed with the exclusion of atmospheric oxygen and under the following conditions:

1 hour at 220° C. under normal pressure ($N_2$),
1 hour at 250° C. under normal pressure ($N_2$),
3½ hours at 260° C. under normal pressure ($N_2$) and
1 hour at 260° C. and 1870 Pa ($N_2$).

The properties of the polyamide obtained are shown in the Table.

EXAMPLE 20

In a manner analogous to that described in Example 19, there is produced a copolyamide from 2.66 g of 1,10-diamino-1,10-dicyclooctyldecane, 2.15 g of diphenyl terephthalate and 0.94 g of 11-aminoundecanoic acid. The properties of the copolyamide are given in the Table.

EXAMPLE 21

Into a reaction vessel of the type described in Example 1, there is placed 16.6 g of terephthalic acid in a mixture of 300 ml of ethanol and 60 ml of water, whereupon 30.85 g of 1,10-diamino-1,10-dicyclopentyldecane is added dropwise at reflux temperature. The resulting heterogenic mixture is maintained with stirring at boiling temperature until the pH value is about 7.5 (after 16 hours). On cooling to room temperature, the formed salt is filtered off and dried in vacuo at 100° C. The yield is 45.4 g (98% of theory). In a manner analogous to that described in Example 1, 8.0 g of this salt is polycondensed with 2.0 g of laurolactam to obtain a copolyamide of which the properties are shown in the Table.

Table

| Ex. No. | Diamine | Salt with TPS[1] % by wt. | Co-condensation component (n) % by weight | Reduced[2] solution viscosity | Glass[3] transition temp. °C. | Water absorption[4] % by wt. | Resistance to boiling water /hours |
| --- | --- | --- | --- | --- | --- | --- | --- |
| 1 | 1,10-diamino-1,10-dicyclohexyldecane | 85 | caprolactam (15) | 0.80 | 149 | 1.3 | >6 |
| 2 | 1,10-diamino-1,10-dicyclohexyldecane | 90 | caprolactam (10) | 0.73 | 156 | 1.2 | >6 |
| 3 | 1,10-diamino-1,10-dicyclohexyldecane | 80 | caprolactam (20) | 0.99 | 142 | 1.4 | about 6 |
| 4 | 1,10-diamino-1,10-dicyclohexyldecane | 90 | 11-amino- (10) undecanoic acid | 0.95 | 156 | 0.8 | >6 |
| 5 | 1,10-diamino-1,10-dicylohexyldecane | 85 | 11-amino- (15) undecanoic acid | 0.95 | 146 | 0.8 | >6 |
| 6 | 1,10-diamino-1,10-dicyclohexyldecane | 80 | 11-amino- (20) undecanoic acid | 1.07 | 137 | 0.8 | >6 |
| 7 | 1,10-diamino-1,10-dicyclohexyldecane | 70 | 11-amino- (30) unecanoic acid | 1.36 | 122 | 0.9 | >6 |
| 8 | 1,10-diamino-1,10-dicyclohexyldecane | 65 | 11-amino- (35) undecanoic acid | 1.47 | 115 | 0.9 | about 6 |
| 9 | 1,10-diamino-1,10-dicyclohexyldecane | 80 | laurolactam (20) | 0.95 | 139 | 0.7 | >6 |
| 10 | 1,10-diamino-1,10-dicyclohexyldecane | 70 | laurolactam (30) | 1.12 | 126 | 0.8 | >6 |
| 11 | 1,10-diamino-1,10-dicyclohexyldecane | 90 | 6,6-salt[5] (10) | 0.75 | 157 | 1.2 | >6 |
| 12 | 1,10-diamino-1,10-dicyclohexyldecane | 85 | 6,6-salt[5] (15) | 0.85 | 151 | 1.3 | >6 |
| 13 | 1,10-diamino-1,10-dicyclohexyldecane | 80 | 6,6-salt[5] (20) | 1.00 | 144 | 1.4 | about 6 |
| 14 | 1,10-diamino-1,10-dicyclohexyldecane | 80 | 12,10-salt (20) | 1.07 | 141 | 0.8 | >6 |
| 15 | 1,10-diamino-1,10-dicyclohexyldecane | 70 | 12,10-salt (30) | 1.11 | 127 | 0.8 | >6 |

Table -continued

| Ex. No. | Diamine | Salt with TPS[1] % by wt. | Co-condensation component (n) % by weight | Reduced[2] solution viscosity | Glass[3] transition temp. °C. | Water absorption[4] % by wt. | Resistance to boiling water /hours |
|---|---|---|---|---|---|---|---|
| 16 | 1,10-diamino-1,10-dicylohexyldecane | 75 | 8,12-salt[7] (25) | 0.98 | 133 | 0.9 | >6 |
| 17 | 1,10-diamino-1,10-dicyclohexyldecane | 85 | caprylic lactam (15) | 0.89 | 148 | 1.0 | >6 |
| 18 | 1,10-diamino-1,10-dicyclohexyldecane | 80 | caprylic lactam (20) | 0.97 | 141 | 1.1 | >6 |
| 19 | 1,10-diamino-1,10-dicyclooctyldecane | 83[8] | 6-aminocaproic acid (17) | 0.87 | 150 | 1.1 | >6 |
| 20 | 1,10-diamino-1,10-dicyclooctyldecane | 80[8] | 11-amino- (20) decanoic acid | 0.75 | 136 | 0.7 | >6 |
| 21 | 1,10-diamino-1,10-dicyclopentyldecane | 80 | laurolactam (20) | 1.02 | 133 | 0.9 | >6 |

[1] TPS = terephthalic acid
[2] dl/g, measured on a 0.5% solution in m-cresol at 25° C.
[3] determined in a closed vessel by means of differential thermoanalysis
[4] after 1 week's storage at room temperature with 65% relative humidity
[5] salt from adipic acid and hexamethylenediamine
[6] salt from 1,10-diaminododecane and sebacic acid
[7] salt from 1,8-diaminooctane and dodecandioic acid (1,12)
[8] converted from diphenyl terephthalate The 1,10-diamino-1,10-dicycloalkyldecanes used in the above Examples can be produced as follows:

(a) 1,10-Diamino-1,10-dicyclohexyldecane: 328.5 g (1 mol) of 3,12-dicyclohexyl-1,2-diaza-1,5,9-cyclododecatriene (diastereoisomeric mixture) is dissolved in 2600 ml of t-butanol in an autoclave with stirrer. After the addition of 33 g of a rhodium/aluminium oxide catalyst (5% by weight of Rh), hydrogen is injected to a pressure of 130–150·10⁵ Pa, and hydrogenation is performed at 150°–180° C. until the absorption of hydrogen is finished. After cooling, the excess hydrogen is released, the suspension is drawn by suction from the autoclave, and the catalyst is filtered off with suction through a small amount of "Hyflo" (filtering auxiliary). The filtrate is concentrated in a rotary evaporator, and the product is purified by distillation to obtain, as the main fraction, 304 g (90% of theory) of 1,10-diamino-1,10-dicyclohexyldecane as colourless oil [b.p. 190°–193° C./7 Pa; $n_D^{20} = 1.4944$; IR (liquid) inter alia bands at 3355, 3278 and 1613 cm$^{-1}$].

(b) 1,10-Diamino-1,10-dicyclopentyldecane: If there are used in the manner described under (a), instead of 328.5 g of 3,12-dicyclohexyl-1,2-diaza-1,5,9-cyclododecatriene, 200 g (0.666 mol) of crude 3,12-dicyclopentyl-1,2-diaza-1,5,9-cyclododecatriene (diatereoisomeric mixture) and correspondingly reduced amounts of catalyst and solvent, the procedure otherwise remaining the same, there is obtained, after chromatographic purification and distillation, 39.2 g (19% of theory) of 1,10-diamino-1,10-dicyclopentyldecane in the form of colourless oil [b.p. 174°–178° C./0.3 Pa; $n_D^{20} = 1.4885$; IR (liquid) inter alia bands at 3355, 3278 and 1613 cm$^{-1}$].

(c) 1,10-Diamino-1,10-dicyclooctyldecane: If there are used in the manner described under (a), instead of 328.5 g of 3,12-dicyclohexyl-1,2-diaza-1,5,9-cyclododecatriene, 65 g (0.168 mol) of 3,12-dicyclooctyl-1,2-diazacyclododecane and correspondingly reduced amounts of catalyst and solvent, the procedure otherwise remaining the same, there is obtained, after chromatographical purification, 43.6 g (66% of theory) of 1,10-diamino-1,10-dicyclooctyldecane in the form of colourless oil [$n_D^{20} = 1.5050$; IR (liquid) inter alia bands at 3333, 3278 and 1613 cm$^{-1}$].

The 1,2-diaza-1,5,9-cyclododecatriens or 1,2-diazacyclododecanes used as starting products can be produced by the process described in the German Offenlegungsschrift No. 2,330,087.

I claim:

1. A transparent moldable polyamide which is obtained by polycondensing a mixture of essentially stoichiometric amounts of terephthalic acid, or of an amide-forming derivative thereof, and a diamine of the formula I $$H_2N-CH-(CH_2)_8-CH-NH_2 \quad (I)$$
$$\phantom{H_2N-}|\phantom{CH-(CH_2)_8-}|$$
$$\phantom{H_2N-}R_1\phantom{CH-(CH_2)_8-}R_2$$

(a) with 10 to (n×2.5)+7.5 percent by weight of an ω-aminocarboxylic acid of the formula II $$H_2N-R_3-COOH \quad (II)$$

or of the corresponding lactam, or (b) with 10 to (m+p/2×2.5)+7.5 percent by weight of a mixture of essentially stoichiometric amounts of a dicarboxylic acid of the formula III $$HOOC-R_4-COOH \quad (III)$$

and a diamine of the formula IV $$H_2N-R_5-NH_2 \quad (IV),$$

or of the equivalent amount of a mixture of essentially stoichiometric amounts of an amide-forming derivative of a dicarboxylic acid of the formula III and a diamine of the formula IV, wherein the weight percentages as defined relate to the sum of all the reaction components, and wherein $R_1$ and $R_2$ independently of one another are cycloalkyl which has 4–12 C atoms and which can be substituted by alkyl, $R_3$ is alkylene having 5–11 C atoms, $R_4$ is alkylene having 4–10 C atoms, and $R_5$ is alkylene having 6–12 C atoms, and wherein n is equal to the number of C atoms in the radical $R_3$, m is equal to the number of C atoms in the radical $R_4$, and p is equal to the number of C atoms in the radical $R_5$.

2. A polyamide according to claim 1, which is obtained by using a diamine of the formula I wherein $R_1$ and $R_2$ are unsubstituted cycloalkyl having 4–8 C atoms.

3. A polyamide according to claim 1 or 2, which is obtained by polycondensation of a mixture of essentially stoichiometric amounts of terephthalic acid, or of an amide-forming derivative thereof, and a diamine of the formula I with 13 to $(n \times 1.3) + 11$ percent by weight of an $\omega$-aminocarboxylic acid of the formula II or of a corresponding lactam, wherein $R_1$ and $R_2$ are each cyclopentyl, cyclohexyl or cyclooctyl, and $R_3$ is straight-chain alkylene having 5–11 C atoms.

4. A polyamide according to claim 1 or 2, which is obtained by polycondensation of a mixture of essentially stoichiometric amounts of terephthalic acid, or of an amide-forming derivative thereof, and a diamine of the formula I with 13 to $(m + p/2 \times 1.3) + 11$ percent by weight of a mixture of essentially stoichiometric amounts of a dicarboxylic acid of the formula III and a diamine of the formula IV, or of the equivalent amount of a mixture of essentially stoichiometric amounts of an amide-forming derivative of a dicarboxylic acid of the formula III and a diamine of the formula IV, wherein $R_1$ and $R_2$ are each cyclopentyl, cyclohexyl or cyclooctyl, $R_4$ is straight-chain alkylene having 4–10 C atoms, and $R_5$ is straight-chain alkylene having 6–12 C atoms.

5. A polyamide according to claim 1, which is obtained by polycondensing a mixture of essentially stoichiometric amounts of terephthalic acid, or of an amide-forming derivative thereof, and 1,10-diamino-1,10-dicyclohexyldecane with 10 to 20% by weight of $\epsilon$-amino-n-caproic acid or caprolactam.

6. A polyamide according to claim 1, which is obtained by polycondensing a mixture of essentially stoichiometric amounts of terephthalic acid, or of an amide-forming derivative thereof, and 1,10-diamino-1,10-dicyclohexyldecane with 10 to 32.5% by weight of 11-aminoundecanoic acid or of the corresponding lactam.

7. A polyamide according to claim 1, which is obtained by polycondensing a mixture of essentially stoichiometric amounts of terephthalic acid, or of an amide-forming derivative thereof, and 1,10-diamino-1,10-dicyclohexyldecane with 10 to 20% by weight of 6—6 salt, or of a mixture of essentially stoichiometric amounts of adipic acid, or of an amide-forming derivative thereof, and hexamethylenediamine.

8. A transparent molded article of the polyamide according to claim 1.

9. A polyamide according to claim 5 wherein the polycondensing is carried out with about 15% by weight of $\epsilon$-amino-n-caproic acid or caprolactam.

10. A polyamide according to claim 6 wherein the polycondensing is carried out with about 15% by weight of 11-aminoundecanoic acid or of the corresponding lactam.

11. A polyamide according to claim 7 wherein the polycondensing is carried out with about 15% by weight of 6—6 salt, or of a mixture of essentially stoichiometric amounts of adipic acid, or of a amide-forming derivative thereof, and hexamethylenediamine.

* * * * *